2,885,416

PROCESS OF PREPARING ZINC CONTAINING FUNGICIDES

Dino Costabello, Novara, Lido Porri, Milan, and Gioacchino Boffa, Novara, Italy, assignors to Montecatini-Societa Generale per l'Industria Mineraria e Chimica, a corporation of Italy No Drawing. Application March 26, 1956
Serial No. 573,637

Claims priority, application Italy April 1, 1955

4 Claims. (Cl. 260—429.7)

This invention relates to a process of preparing a fungicide based on ethylenedithiocarbamates.

The fungicidal power of the metallic dithiocarbamates of ethylene amines, particularly of ethylene diamine, has been known for a long time (see for example Patent 2,317,765 of April 27, 1943). In the past, this type compounds, particularly zinc ethylene-bis-dithiocarbamate, have been proposed for use as a fungicide for agricultural application in lieu of copper sulphate. However, the practical use of this type of products on a large scale has been limited because it was not possible to produce them at sufficiently low cost so that they could compete with copper sulphate.

It is an object of our invention to provide a process whereby a product is obtained from ethyleneamines that, based on ethylenedithiocarbamate, has a very high fungicidal power and can be made at considerably lower cost than products of this type obtained by hitherto known processes.

Ethylenedithiocarbamates that have been previously proposed as fungicides were always prepared by starting from single ethyleneamines (see for example the above-mentioned Patent No. 2,317,765) which had to be first separated from the mixture of ethyleneamines obtained when reacting dichloroethane with ammonia. In this reaction, no matter which particular method is employed, variable amounts of diethylenetriamine, triethylenetetramine, tetraethylenepentamine, etc. are obtained together with ethylenediamine in the form of hydrochlorides.

In order to obtain the single free amines in the pure state it is necessary to remove the hydrochloride acid with caustic soda or lime, separate the free amines from the salt solutions, and separate them from each other by fractionation. This comprises a sequence of complicated and rather troublesome operations.

We have now found that it is possible to obtain products of high fungicidal activity by means of a considerably simpler process and at correspondingly lower cost, if the aqueous solution of the mixed amine hydrochlorides obtained when reacting dichloroethane with ammonia is used directly in the preparation of the fungicidal compounds. The reaction between dichloroethane and ammonia may be carried out in various ways, resulting in mixtures of ethyleneamines of different compositions. In practice, the reaction is carried out at 100–120° C. with a molar ratio between ammonia and dichloroethane varying from 40:1 to 55:1, whereby a 30–70% aqueous ammonia solution is used, or anhydrous ammonia. When operating under these conditions, the reaction mixture contains the individual amines in amounts varying approximately within the following limits:

| | Percent |
|---|---|
| Ethylenediamine | 65–80 |
| Diethylenetriamine | 19–29 |
| Triethylenetetramine | 1– 4 |
| Higher amines | 0– 2 |

We found that differences in the composition of the ethyleneamines mixtures, which may result by varying, as above mentioned, the conditions in the reaction between dichloroethane and ammonia, have no practical influence on the fungicidal activity of the end product.

According to the process of the present invention, the solution of mixed amine hydrochlorides, obtained for example by means of a reaction between anhydrous ammonia and dichloroethane under the above-mentioned conditions, is treated with caustic soda or lime in an amount necessary to separate the free amines from the hydrochlorides and with an excess of caustic soda corresponding to the amount necessary to form ethylenedithiocarbamic acid salts in a subsequent reaction with carbon disulphide. By means of this reaction a solution of a mixture of ethylenedithiocarbamic acid salts is obtained from which, after a double exchange reaction, for example with a soluble zinc salt, a zinc ethylenedithiocarbamate product is obtained, the fungicidal activity of which corresponds exactly with that of the zinc ethylene-bis-dithiocarbamate obtainable from pure ethylenediamine.

This process offers considerable advantages over hitherto known processes of this type. The most important of these advantages are:

(1) The direct utilization by means of a single operation of the entire crude amine mixture obtained upon reacting dichloroethane with ammonia, and (2) The practical possibility of replacing, at a considerable economic advantage, caustic soda with lime when liberating the bases from their hydrochlorides.

Where, as according to prior processes, the separation of individual amines is required, this substitution does not offer any practical advantages, since the subsequently required step is a troublesome dry distillation for decomposing the amine calcium chloride complexes. We also discovered the surprising fact that the use of lime instead of soda results in higher yields, based on both the amines and the carbon disulphide. We found that, when using caustic soda in this operation, considerable amounts of ethylenethiourea and sodium trithiocarbonate are formed; whereas no such products are observed when using lime. This may explain why the yields, which are of the order of 80% or lower in the first case, become almost quantitative when lime is used.

In the second step, that is during the preparation of the final products from the solution of the sodium or calcium ethylenedithiocarbamates, the solution, as will be more fully described in the examples, is neutralized and then treated with a salt of the metal whose insoluble ethylenedithiocarbamate is required, the operation being carried out at a pH value between 6 and 8.

When using a soluble zinc salt in this step, a precipitate is obtained which, after filtration, drying, etc. by known methods, yields a product whose fungicidal activity tested on "Plasmopara Viticola," as will be illustrated further below, is of the same order of magnitude as the activity of commercial zinc ethylenebisdithiocarbamate.

The following examples will illustrate the details of the process according to the invention.

EXAMPLE 1

To an aqueous solution of ethyleneamines hydrochlorides obtained by reacting dichloroethane with ammonia, and containing 3–5 equivalents of combined nitrogen per liter, i.e. approximately 100–150 g. of amines, a caustic soda solution (200 g./liter) was added at room temperature in an amount sufficient to liberate the amines from the hydrochlorides and to form dithiocarbamic acid salts. Thereafter, a slight excess of carbon disulphide was added over a period of one hour while stirring the solution at 20-35° C. The mixture was kept at this temperature for two additional hours and was then neutralized against phenolphthalein by means of dilute HCl. The resulting sodium salts of dithiocarbamic acids were obtained at a yield of about 75%, based on the ethyleneamine mixture employed.

EXAMPLE 2

The sodium salts solution obtained according to Example 1 was treated at 19-25° C. with a concentrated aqueous solution of a soluble zinc salt (for ex. 60% $ZnCl_2$); the corresponding insoluble zinc salts of the dithiocarbamic acids were obtained in quantitative yield.

EXAMPLE 3

The operation of Example 1 was repeated, except that sodium hydroxide was replaced by a corresponding amount of calcium oxide. The yield, based on the employed ethyleneamine mixture, exceeded 90%.

EXAMPLE 4

The calcium salts solution obtained according to Example 3 was treated at 15-25° C. with a concentrated solution of a soluble zinc salt (for ex. about 60% $ZnCl_2$). The corresponding insoluble salts of the dithiocarbamic acids were obtained in quantitative yield.

Chemical evaluation

The products obtained according to the foregoing examples were analyzed to establish the percentage of active substance, by determining the amount of $CS_2$ evolving from 100 gr. of the dry product upon treatment with sulphuric acid. The percentage of amine-bound $CS_2$, determined in this manner, represents, according to accepted practice, an index of the percentage of active substance in the product.

The following compounds have been tested:

(A) Zinc ethylenebisdithiocarbamate obtained by means of a double exchange reaction between a 60% aqueous $ZnCl_2$ solution and an aqueous solution of sodium ethylenebisdithiocarbamate resulting from reaction of ethylenediamine with $CS_2$ and NaOH.

(B) Same as (A), with the difference that the zinc ethylene bisdithiocarbamate was obtained from the corresponding calcium salt resulting from a reaction between ethylenediamine $CS_2$ and $Ca(OH)_2$.

(C) Zinc ethylenedithiocarbamates obtained by means of a double exchange reaction, starting from the sodium salts as described in Example 1.

(D) Same as (C), with the difference that zinc ethylenedithiocarbamates are obtained by way of calcium salts, as described in Example 3.

*Results obtained.*—Percent $CS_2$ corresponding to percent of active substance as Zn ethylenebisdithiocarbamate:

| | | Percent active substance |
|---|---|---|
| (A) | 42.2% $CS_2$ | 76.4 |
| (B) | 43.4% $CS_2$ | 78.8 |
| (C) | 43.8% $CS_2$ | 79.2 |
| (D) | 42.7% $CS_2$ | 77.5 |

A sample of a commercial product based on zinc ethylenebisdithiocarbamate tested under similar conditions produces the following results: Percent $CS_2$ 41.5%, corresponding to 75% of Zn ethylenebisdithiocarbamate.

Biological evaluation

The biological evaluation comprises a comparison with Dithane Z-78, a commercial product based on zinc ethylenebisdithiocarbamate. The tests include a determination of the residual activity of the respective products on vines infested with "*Plasmopara viticola*" and grown in a hothouse at 27-30° C. and resistance of the products to rainfall.

Residual activity

Small plants aged one to two months, obtained from vine cuttings grown in a hothouse, on which only 3 or 4 leaves of the most uniform size and surface area were left, were sprayed in the usual manner with aqueous suspensions of the products at different concentrations. Each test was repeated three times; after a short stay in the hothouse the plants were sprayed with a uniform amount of conidia of *Plasmopara viticola*. The plants were then kept for one night in a room at 27-30° C. and 100% relative humidity and then in a hothouse at 27-30° C. and 60-70% relative humidity. After six days the vines were brought again into a room of 100% relative humidity and kept there until appearance of the fungus. On the tenth day the diseased surface was measured for each leaf of each of the treated vines as well as of the test vines. From these data the "disease index" (extent of diseased surface on the leaves of the treated plants, referred to diseased surface on the leaves of the test plants made equal to 100) were calculated for each product and each concentration.

Residual activity after rainfall

Two groups of vines were sprayed, using with the usual technique one or more concentrations of aqueous suspensions of the products.

One of the two groups was subjected to an artificial rain (sprinkling) for two minutes immediately after drying of the spray. Immediately thereafter, all the leaves were out. Sprinkled leaves as well as the leaves from unsprinkled plants were then brought into a moist room and, after infection with *Plasmopara viticola*, were kept there for ten days at 27-30° C.

The disease index was measured as above.

TABLE 1

Residual activity, after ten days' stay in a hothouse, at 27-30° C. on vines infested with *Plasmopara viticola*.

[Sample—Disease index, referred to test plants, when using aqueous spray suspensions containing the following percentages of active substance, by weight.]

| | 0.3% | 0.1% | 0.03% |
|---|---|---|---|
| Dithane Z-78 | 0.22 | 0.28 | 4.23 |
| A | 0 | 0.39 | 0.44 |
| B | 0.83 | 1.67 | 2.61 |
| C | 0 | 0 | |
| D | 0.8 | 0.55 | 0.88 |

TABLE 2

Residual activity after rainfall (sprinkling).

[Sample—Disease index, referred to test plants, when using aqueous spray suspensions containing 0.2% by weight of active substance.]

| | on unsprinkled leaves | on sprinkled leaves |
|---|---|---|
| Dithane Z-78 | 0 | 40.1 |
| A | 0 | 36.7 |
| B | 0 | 58.7 |
| C | 0 | 24.2 |
| D | 0 | 14.5 |

The foregoing data show that the products obtained in accordance with the present invention have an activity which is generally equal, and sometimes higher, than that of the products obtained by hitherto known methods.

We claim:

1. A process for making a fungicidal product, which comprises preparing an aqueous solution of a mixture of ethylenediamine and polyethylenepolyamines hydrochlorides containing 65-80% ethylenediamine hydrochloride, 19-29% diethylenetriamine hydrochloride, 1-4% triethylenetramine hydrochloride, and up to 2% higher polyethylenepolyamines hydrochlorides as obtained from the reaction between dichloroethane and ammonia, adding at room temperature an amount of caustic soda in aqueous solution sufficient to liberate the amines from the hydrochlorides and to neutralize subsequently formed dithiocarbamic acids, treating the alkaline solution at 20-35°

C. with an amount of carbon disulfide stoichiometrically equivalent to the amine nitrogen present to form said dithiocarbamic acids, adding diluted hydrochloric acid until the solution is neutral against phenolphthalein, and precipitating the fungicidal product by adding at room temperature, while stirring, a 1–2% excess over the stoichiometric amount of an about 60% aqueous solution of an inorganic zinc salt taken from the group consisting of zinc chloride and zinc sulfate.

2. The process of claim 1, in which the fungicidal product is precipitated by adding an about 60% aqueous solution of zinc chloride.

3. A process for making a fungicidal product, which comprises preparing an aqueous solution of a mixture of ethylenediamine and polyethylenepolyamines hydrochlorides containing 65–80% ethylenediamine hydrochloride, 19–29% diethylenetriamine hydrochloride, 1–4% triethylenetetramine hydrochloride, and up to 2% higher polyethylenepolyamines hydrochlorides as obtained from the reaction between dichloroethane and ammonia, adding at room temperature an amount of milk of lime in aqueous solution sufficient to liberate the amines from the hydrochlorides and to neutralize subsequently formed dithiocarbamic acids, treating the alkaline solution at 20–35° C. with an amount of carbon disulfide stoichiometrically equivalent to the amine nitrogen present to form said dithiocarbamic acids, adding diluted hydrochloric acid until the solution is neutral against phenolphthalein, and precipitating the fungicidal product by adding at room temperature, while stirring, a 1–2% excess over the stoichiometric amount of an about 60% aqueous solution of an inorganic zinc salt taken from the group consisting of zinc chloride and zinc sulfate.

4. A process for making a fungicidal product, which comprises preparing an aqueous solution of a mixture of ethylenediamine and polyethylenepolyamines hydrochlorides containing 65–80% ethylenediamine hydrochloride, 19–29% diethylenetriamine hydrochloride, 1–4% triethylenetetramine hydrochloride, and up to 2% higher polyethylenepolyamines hydrochlorides as obtained from the reaction between dichloroethane and ammonia, adding at room temperature an amount of an alkali of the group consisting of caustic soda and milk of lime in aqueous solution sufficient to liberate the amines from the hydrochlorides and to neutralize subsequently formed dithiocarbamic acids, treating the alkaline solution at 20–35° C. with an amount of carbon disulfide stoichiometrically equivalent to the amine nitrogen present to form said dithiocarbamic acids, adding diluted hydrochloric acid until the solution is neutral against phenolphthalein, and precipitating the fungicidal product by adding at room temperature, while stirring, an aqueous solution of a zinc salt taken from the group consisting of zinc chloride and zinc sulfate.

References Cited in the file of this patent

UNITED STATES PATENTS 2,317,765    Hester _____ Apr. 27, 1943

OTHER REFERENCES

Collins et al.: Jour. Amer. Pharm. Assoc., vol. XLIV, No. 5, May 1955 (pp. 310–313).